UNITED STATES PATENT OFFICE 2,138,895

RUBBER COMPOSITIONS AND METHODS OF PREPARING SAME

Peter J. Wiezevich, Elizabeth, N. J., now by judicial change of name Peter J. Gaylor, assignor to Standard Oil Development Company, a corporation of Delaware No Drawing. Application May 5, 1937, Serial No. 140,865

18 Claims. (Cl. 106—23)

This invention relates to improved rubber compositions and methods of preparing same.

This application is a continuation in part of my application 717,575, which was filed on March 27, 1934. This earlier application relates to rubber compositions containing a plastic polymer of isobutylene and the like having an average molecular weight of over 800 and preferably above 4,000 or 5,000.

In the compounding of rubber it is common practice to incorporate with the rubber a small amount of a plasticizer or softener to increase the pliability, durability and tack of the rubber composition as well as to facilitate the compounding both by aiding the dispersion of solids and by lubricating the mix. Many types of softeners have been used in the prior art such as vegetable, animal, and mineral oils, greases, asphaltic fluxes, fatty acids, rosin, cumar resins, tars, pitches and waxes.

The present invention involves primarily the preparation of a new and improved type of softener as will be described more fully hereinafter.

According to the present invention, a novel type of softener is prepared which preferably is a more or less plastic and elastic hydrocarbon compound having a high molecular weight such as between the approximate limits of 800 to 5,000 or 10,000 or even 15,000 or more, which is substantially greater than that of paraffin wax generally considered to be between about 250 and 400. These compounds preferably have a linear chemical structure which may be represented by an almost completely saturated extremely long chain of carbon atoms with alkyl groups such as methyl, etc., attached as side chains onto either all of the carbon atoms in the chain or else just one or certain ones such as every second or third carbon atom.

Polymers of this general structure may be advantageously prepared by polymerizing iso-olefins (isobutylene, iso-amylene, etc.) at low temperature, in the presence of a volatilizable inorganic halide as catalyst. The temperature may be between the approximate limits of 5° C. and —10 or —20° C. or even lower, depending upon the particular catalyst used. As catalyst, boron fluoride has been found particularly satisfactory. Also, boron fluoride mixed with hydrogen fluoride may be used as well as phosphorus trifluoride or pentafluoride and even aluminum chloride, preferably statu nascendi as obtained when aluminum is acted on by hydrogen chloride. In the case of aluminum chloride, 3 to 5% of the catalyst may be used, whereas in the case of the previously mentioned catalyst, 1% or so may be sufficient.

Suitable volatile or non-volatile diluent such as pentane or a commercial naphtha, or a light or heavy oil which may later serve as additional softener when incorporated into the rubber may be used. Inasmuch as such polymerizations are usually exothermic, it is generally desirable to provide some means of cooling the reaction chamber, either externally or internally. The molecular weight may be readily controlled by the temperature and duration of the polymerization.

As a particular example of a preferred method of preparing such a polymer, isobutylene is polymerized at a temperature of about —10° C. by bubling boron fluoride gas through a solution of isobutylene dissolved in propane. A polymer of about 4,000 to 6,000 molecular weight may be prepared in this manner and the volatile solvent is removed by distillation, after which any catalyst remaining dissolved or suspended in the liquid is removed by blowing with steam or by washing and kneading with water or dilute caustic soda, leaving the colorless plastic polymer residue. Polymers of lower or higher molecular weight are prepared by varying the purity of the isobutylene and the temperature of polymerization.

A polymer having a much higher molecular weight, such as 30,000 or 50,000 up to 100,000 or 200,000 or even 500,000, (as determined by the viscosity method described in Staudinger's "Die Hochmolekulare Verbindungen") can be compounded with rubber to make compositions having substantially different properties than those of compositions containing the lower molecular weight polymer; for instance, when the lower polymer is compounded with rubber it has a plasticizing effect and makes the compounded product considerably softer than the original rubber, also it causes a certain amount of reduction in tensile strength and elongation when used in preparing a vulcanized rubber. On the other hand, the new high molecular weight polymer is not plastic, but is elastic instead, and consequently, when compounded with rubber it imparts thereto its oxidation-resisting and other beneficial characteristics without causing any appreciable reduction in tensile strength and elongation, and without causing as much softening as occurs with the low molecular weight polymer. It also shows less tendency to creep to the surface than numerous materials which had been used heretofore as softeners and compounding agents, such as paraffin wax. This is primarily due to the fact that the polymer having such a high molecular weight has a lesser tendency to "flow" than the lower polymer and besides, furnishes better cohesion with the rubber particles.

Other characteristic differences between the higher polymer compared to the lower polymer are, that the higher polymer has a more potent thickening action when dissolved in various solvents and is swellable in benzene although partially soluble, whereas the lower polymer dissolves completely in benzene. Also the higher polymer has an extremely high viscosity index (i. e. is subjected to only a small change in viscosity with a given change in temperature), and consequently rubber compositions containing this higher polymer show less change in pliability or consistency with changes in temperature unless the temperature is raised so high that some depolymerization occurs.

Plasticizers prepared according to the above described method have a high viscosity index, i. e., they show a relatively little change in viscosity with temperature. This property is highly desirable when the softener is to be compounded in certain types of rubber goods where it is desirable to have relatively constant properties of pliability and elasticity over a fairly wide range in temperature.

The amount of this new polymerized hydrocarbon softener to be used in making compounded rubber compositions may vary over a wide range such as from 0.1 to 50% or even considerably more in case it is desired more to use rubber as a stabilizing or body-giving agent for the plastic hydrocarbon polymer. However, when used simply as a softener or plasticizer in ordinary rubber compounding approximately 0.1% to 1% or 5% or possibly 10%, based on the content of rubber plus plasticizer in the mix, is preferred.

The rubber stock which may be plasticized with this new softening agent may comprise any of the natural crude rubber stocks with or without subsequent curing, as well as rubber substitutes such as polyolefine sulfide, polymerized vinyl chloride or acetate or synthetic rubbers prepared by polymerization of butadiene, isoprene, chlorprene, etc. Various crude rubbers available on the market are hevea, crepe, smoked sheet, Para, Guayule, gutta-percha, balata, and others. In commercial practice a certain amount of reclaimed rubber is often mixed with the fresh crude rubber and other ingredients are frequently added such as fillers, reinforcers, vulcanizing agents, accelerators, antioxidants, etc. in addition to the softeners already mentioned.

Although the actual method of preparing this high molecular weight polymer per se, is not part of this invention, a brief description of its preparation will be given for the sake of illustration and clearness.

Whereas the low molecular weight polymer was prepared by polymerization of an iso-olefine, preferably iso-butylene, in the presence of a volatile inorganic halide, particularly boron fluoride, at temperatures such as below 5° C. or even below −10° C., the higher polymer is produced by carrying out the polymerization at very much lower temperatures, such as −50° C. or even −100° C., using a substantially pure iso-butylene as starting material and a substantially pure boron fluoride as a catalyst and preferably carrying out the polymerization in the presence of a suitable solvent for the iso-butylene such as purified ethylene or other low-boiling liquefied gaseous hydrocarbons. It is particularly important in preparing the extremely high molecular weight polymer that the starting materials should be freed from sulfur compounds and other substances which act as poisons to the polymerization of the iso-butylene. After the polymerization has been completed, the pressure is released and the temperature allowed to rise to room temperature. The product should be washed or otherwise purified till it contains less than 0.1% and preferably less than .01% of inorganic salt.

If desired, the polymerized product may be separated into fractions having different molecular weights, either by selective extraction, or solution and selective precipitation, using solvents such as ethane, propane, naphtha, benzol, acetone-benzol, etc. at the proper temperature. In this way, the polymers having a molecular weight of 100,000 or more or less may be separated from the still higher molecular weight polymers.

Although it is preferred to use boron fluoride as the catalyst, one may also use aluminum plus hydrogen chloride, phosphorous trifluoride, phosphorous pentafluoride, etc. or other volatile inorganic halides, although these do not give as good results as the boron fluoride.

It may be desirable to add certain modifying agents to this high molecular weight polymer during the polymerization in order to alter the structure of the polymer formed, so that when the resultant product is compounded with rubber the final product will have the desired properties.
Suitable modifying agents for such purposes include polymerizable unsaturated compounds such as divinyl acetylene, divinyl benzene, chlorprene, butadiene, etc. reactive oxygen compounds such as acetaldehyde, acetone, phenol, vinyl ethers, etc., compounds containing the group

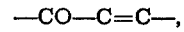
—CO—C=C—, aromatic hydrocarbons such as benzol, indene, etc. It may also be desirable to add coloring agents such as soluble colored liquids or solids or insoluble pigments or dyes as well as fillers, plasticizers, resins, etc. either before, during or after polymerization, and it may also be desirable to incorporate with this polymer, preferably after polymerization but prior to the release of the solvent, a suitable compound capable of serving as an oxidation inhibitor for the rubber with which the polymer is to be compounded.

In order to have all of the ingredients properly mixed or blended together, several different methods may be used, first of which is mixing on the usual rubber mill or Banbury mixer which comprises essentially a series of steel rolls set fairly close together so that they effect a combined grinding and kneading action on the plastic rubber mass being mixed. Another method of mixing is to dissolve both the rubber and the polymerized hydrocarbon softener separately in a suitable volatile solvent such as naphtha and then to mix these two solutions, continuing the agitation while evaporating off the solvent. If the mixing is not continued a separation of the materials into two layers may occur. If this product is to be cured the usual curing agents and accelerators as well as other materials such as fillers, anti-oxidants, etc., may be admixed with the rubber and softener before evaporation of the solvent and then the curing effected after the solvent has been removed.

In the manufacture of dipped goods, these plasticizing polymers may be added directly to the dipping solution, or they may be used as a separate dip in solutions of Varsol, naphtha, carbon tetrachloride, benzol, or similar solvents. Alternate dips of this material and rubber can be made in this manner if so desired. Sulfur chloride may be added to one of the alternate dipping solutions, if desired, to effect curing. Fillers, reinforcers, colored pigments, anti-oxidants and other known addition agents may, of course, be added to the dipping solution or may be incorporated in the rubber before it is dissolved in the solvent to provide a cement. Finished goods dipped from these cements may be cured or vulcanized by any of the common methods known to the art.

The plastic hydrocarbon polymer may be incorporated any time before vulcanization into batches which are to be subjected to that treatment. In making so-called "hard rubber", a small amount of plastic polymer may be used to give the finished product greater flexibility and toughness. The polymer may also be incorporated into rubber-like products or derivatives such as the recently developed materials made by treatment of rubber with halogen compounds such as boron fluoride, fluoboric acid, chlorostannic acid, etc.

Use of such plasticizing polymers may also be made in the manufacture of rubber articles from latex. In this case, a suspension or emulsion of the polymer, such as isobutylene polymer, may be made and employed separately, or in conjunction with, or admixed with the latex emulsion. In this case the resulting mixture may be used with any of the common methods of rubber deposition, such as electrolytic deposition, or the use of chemical coagulating agents for the production of finished goods.

In the preparation of rubberized fabrics, the rubber impregnated cloth may be coated with a layer of these plasticizing polymers, and vice-versa, i. e. the fabric may be coated first with these polymers, as by dipping the goods in a solution thereof, and following by a dip with rubber. Another outside layer of plasticizing polymer may also be added on the rubber coating. Also, these plasticizing polymers and/or rubber, or mixtures of the two, may be calendered or frictioned on the textile fabrics with any of the methods well known to the art.

Plasticized rubber compositions prepared according to the present invention not only have the usual properties imparted to such compositions by ordinary softeners but they have the additional advantages that owing to their particularly inert nature they also serve to a certain extent as anti-oxidants and help to prevent sun-cracking of the compounded goods. Such plasticized rubber compositions may be used for a wide variety of purposes as is well known in the art, but are especially suitable for use in manufacturing soft moulded mechanicals, dipped goods and coated fabrics.

The proportions in which the high molecular weight polymer prepared as described above, should be compounded with rubber may vary over a wide range such as from 1–95%, depending upon the intended use, although generally from 1–25% or preferably 5–15% are satisfactory limits when the polymer is used essentially for improving the properties of rubber, and 75–95% may be used when the purpose is to use a relatively small amount of rubber for "firming" or increasing the rigidity of the polymer and making it susceptible to vulcanization. It is of course realized that many compositions of intermediate proportions may be used to advantage in certain cases as will appear in some of the examples herebelow.

The rubber compositions prepared according to this invention are especially suitable for the production of stable elastic fibers which may be employed in the manufacture of textile materials and the like, according to processes disclosed in my co-pending application Ser. No. 72,443 filed on April 2, 1936. For example, a satisfactory product of this type may be prepared by milling together a mixture of rubber with polyisobutylene and emulsifying it to produce a latex-type of suspension in which are incorporated vulcanizing agents, antioxidants, accelerators, pigments, fillers, and the like. The suspension may then be squirted through a nozzle of desired diameter into a coagulating bath wherein the composition separates out into threads of desired shape and size. The resulting product so produced may then be passed through a vulcanizing zone and spun or coated with textile materials, etc.

The polyisobutylene present in the rubber composition produces a pronounced effect thereon. Whereas ordinary compounded and vulcanized rubber cracks and becomes brittle on aging (in spite of the presence of age-resistors and anti-oxidants) the present compositions show very little change in this respect. In the case of "ebonite" type products prepared according to this invention, the polyisobutylene imparts considerable toughness making it possible to bounce these products without breakage, while "ebonite" is well known to be a rather brittle material.

The polyisobutylene-rubber compositions containing vulcanizing agents may be dissolved in solvents or otherwise suspended in liquid media and employed for coating or impregnating fibrous, porous, or non-porous materials and especially upon curing (usually by heating at the usual vulcanizing temperatures) very stable, flexible, and acid or alkali resistant fillings or coatings may be prepared. Coatings of this type may be removed from the surface upon which they are made and employed as self-supporting films, e. g. for wrapping and other similar uses. Compositions such as linoleum, resins, waxes, gums, plastics, cements, and the like may be considerably improved by the use of the compositions prepared according to the methods described above.

The polymer thus prepared may be compounded with rubber in many different ways and for many different purposes, and although it is not possible to enumerate all such methods and purposes a few will be given for the sake of illustration;

*Example 1*

5% of an iso-butylene polymer having an average molecular weight of about 100,000 is incorporated with a raw rubber (so-called "smoked sheet") and worked up on the usual rubber mill, adding about 5% of zinc oxide filler, 25% of carbon black, 3% of sulfur and ½% each of anti-oxidant and a vulcanization accelerator, and the compounded batch is cured for 30 min. at 300° F.

*Example 2*

The following rubber composition was prepared:

| | Parts by weight |
|---|---|
| Polyisobutylene (average molecular weight about 150,000) | 100 |
| Crepe rubber | 25 |
| Stearic acid | 0.5 |
| Hexamethylene tetramine | 0.25 |
| Sulfur | 1.0 |
| Zinc oxide | 1.5 |

This mixture is milled for 10 minutes, pressed into sheets on a heated hydraulic press, and vulcanized for 30 minutes at 310° F. The product is excellent as a packing for sulfuric acid pumps.

*Example 3*

A suitable formula for preparing a carbon black tire tread is as follows:

| | Parts |
|---|---|
| Smoked sheet | 100.0 |
| Reclaim | 30.0 |
| Reinforcer (carbon black) | 50.0 |
| Filler (ZnO, clay, etc.) | 10.0 |
| Softener (polym. isobutylene of 5,000 molecular weight) | 3.0 |
| Sulfur | 5.0 |
| Anti-oxidant | 1.0 |
| Accelerator | 1.0 |
| Total | 200.0 |

Cure 30 min. at 295° F.

*Example 4*

50 parts of pale crepe rubber were mixed on a rubber mill with 50 parts of polymerized isobutylene having a molecular weight of about 8,000. The two materials blended very easily, the toughness and elasticity of the rubber being reduced, and the pliability being increased, in proportion to the amount of plastic hydrocarbon polymer used.

*Example 5*

The following formula may be used as an adhesive tape dough:

| | Parts |
|---|---|
| Pale crepe | 50.0 |
| Rube reclaim | 50.0 |
| Polymer (10,000 molecular weight) | 30.0 |
| Mineral oil softener | 10.0 |
| Zinc oxide | 25.0 |
| Lithopone | 75.0 |
| Total | 240.0 |

These materials are milled together in the usual manner and either petroleum naphtha or benzol or a mixture of the two added to give the desired consistency. The dough is then spread upon suitable fabric to provide the tape.

It is not intended that the invention be limited by any of the specific examples given hereinabove nor by any theories of the operation of the invention but only by the appended claims in which it is intended to claim all inherent novelty in the invention as broadly as the prior art permits.

I claim:

1. Composition comprising a rubber stock and a polymerized aliphatic iso-olefin having an average molecular weight of above 800 as determined by the viscosity method.

2. Composition comprising an unvulcanized rubber stock and a polymerized aliphatic iso-olefin having an average molecular weight of above 800 as determined by the viscosity method.

3. Composition according to claim 2 in which the rubber stock comprises unvulcanized natural rubber.

4. Composition comprising an unvulcanized natural rubber and polymerized isobutylene having an average molecular weight of above 800 as determined by the viscosity method.

5. Composition according to claim 4 in which the polyisobutylene has an average molecular weight of above 30,000.

6. Composition comprising an unvulcanized natural rubber and polymerized isobutylene having an average molecular weight above 30,000, said polymerized isobutylene being present in the proportion of at least 5% of the mixture.

7. Composition comprising an unvulcanized natural rubber and polymerized isobutylene having an average molecular weight of above 30,000, said polymerized isobutylene being present in the proportion of at least 50% of the mixture.

8. Composition according to claim 7 in which the polymerized isobutylene contains less than 0.1% of inorganic salt.

9. Composition comprising an unvulcanized rubber stock, a vulcanizing agent and a polymerized aliphatic iso-olefin having an average molecular weight above 800 as determined by the viscosity method.

10. Composition according to claim 9 in which the rubber stock comprises unvulcanized natural rubber.

11. Composition comprising an unvulcanized natural rubber, a vulcanizing agent, and polymerized isobutylene having an average molecular weight of above 800 as determined by the viscosity method.

12. Composition according to claim 11 in which the polymerized isobutylene amounts to at least 5% of the mixture.

13. Composition according to claim 11 in which the polymerized isobutylene amounts to at least 50% of the mixture.

14. Composition comprising a rubber stock and polymerized isobutylene having an average molecular weight of above 800, said composition being in the vulcanized condition.

15. Composition according to claim 14 in which the rubber stock is natural rubber.

16. Composition according to claim 14 in which the rubber stock is natural rubber and the polymerized isobutylene has an average molecular weight of above 30,000.

17. An ebonite type hard rubber composition comprising a vulcanized mixture of natural rubber and polymerized isobutylene having an average molecular weight of above 30,000.

18. Composition according to claim 17 in which the polymerized isobutylene contains less than 0.1% of inorganic salt.

PETER J. WIEZEVICH.